Oct. 12, 1971    J. J. BORON ET AL    3,611,808
DISPOSABLE SAND CUP AND SUPPORT
Filed Feb. 9, 1970
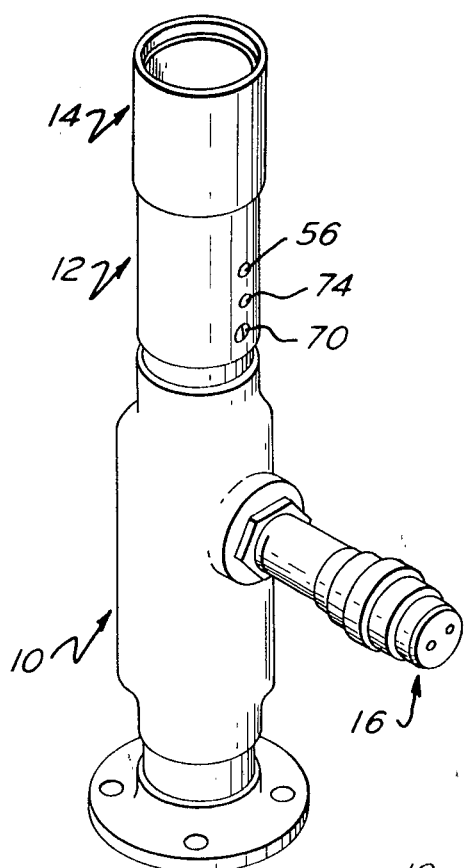
FIG.1
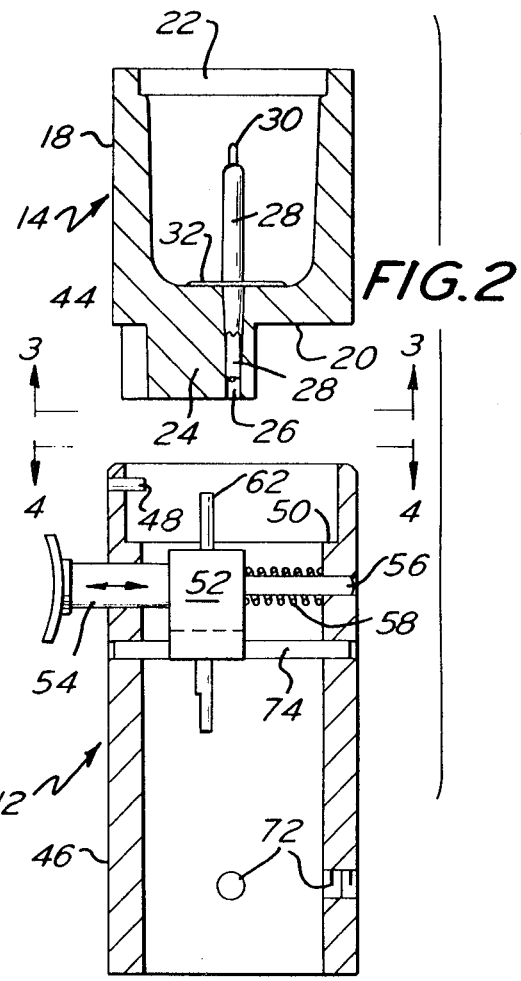
FIG.2
FIG.4
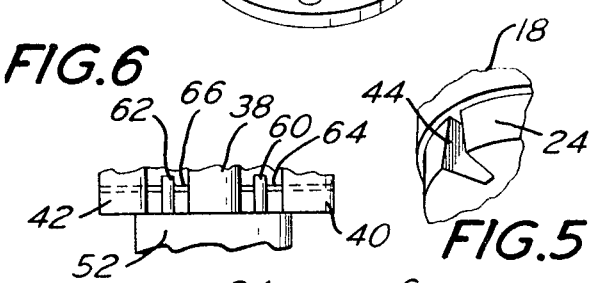
FIG.6    FIG.5
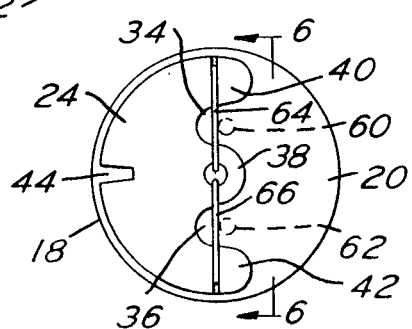
FIG.3
INVENTORS
JOSEPH J. BORON
THOMAS A. LUPPERGER
BY
Seidel, Gonda & Goldhammer
ATTORNEYS.

United States Patent Office 3,611,808
Patented Oct. 12, 1971

3,611,808
DISPOSABLE SAND CUP AND SUPPORT
Joseph J. Boron, Doylestown, and Thomas A. Lupperger, Philadelphia, Pa., assignors to Electro-Nite Co., Philadelphia, Pa.
Filed Feb. 9, 1970, Ser. No. 9,806
Int. Cl. G01k 11/06; G01n 25/06; H01r 19/02
U.S. Cl. 73—359                                    10 Claims

ABSTRACT OF THE DISCLOSURE

A disposable sand cup and support for use in connection with measuring carbon content of iron or steel is disclosed. The cup contains horizontally disposed thermocouple wires which are partially exposed for contact with movable contact pins on the cup support.

---

The temperature of a cooling sample of molten iron or steel goes through five phases: it drops, it remains constant, it drops, it remains constant again, it drops again. The first point at which it remains constant is known as the liquidus arrest point. It occurs because a molecular reaction is taking place within the sample which generates as much heat as it lost through cooling, thus maintaining the temperature constant for a short period of time. The liquidus arrest point is a function of the carbon content of the steel or iron. By determining the liquidus arrest point, the corresponding carbon content can be accurately determined.

The present invention includes a disposable cup made from sand or other equivalent material having specially designed contacts formed by horizontally disposed portions of the thermocouple wires. The disposable cup of the present invention is an improvement over commercially available cups which purportedly are of the type disclosed in U.S. Pat. 3,267,732. The cups commercially available are subject to various difficulties during usage which have resulted from the manner in which the thermocouples are supported for contact with the circuitry coupled to the recorder. The disposable cup of the present invention is structurally interrelated in a manner whereby the difficulties are overcome.

The disposable cup of the present invention is a monolithic mass of sand or other equivalent material retained by a binder. A thermocouple is provided within a central bore in the cup and is axially disposed of the cup. Within the cup, the thermocouple is provided with a coating of electrical resistor cement or electrical refractory cement. The bottom wall of the cup is provided with a partial extension having two vertically disposed cavities. The thermocouple wires are horizontally disposed and extend along a cup diameter across the cavities and along notches in boss projections. The exposed portions of the thermocouple wires are adapted to engage mating contacts on a support.

The support for the disposable cup is provided with horizontally movable contacts spring-biased to an inoperative position. When installing the cup, the contacts are moved to an operative disposition by means of an actuator. The support includes a locating pin which cooperates with a locating notch on the cup to assure proper alignment. The thermocouple provided in the cup provides a signal for a recorder whenever a molten sample is poured into the cup. The recorder can be calibrated directly in points of carbon. The whole process from spoon to result takes less than one minute. After read-out, the cup can be simply ejected from its support, another quickly inserted in its place, and analysis of another sample immediately undertaken.

It is an object of the present invention to provide a novel disposable cup for use in determining carbon content of molten metal.

It is another object of the present invention to provide a novel cup for use in determining carbon content of molten metals which is simple, reliable, and inexpensive.

It is another object of the present invention to provide a novel disposable cup for use in connection with measurements of molten metal together with a novel cooperating support.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a perspective view of a stand on which is mounted a disposable cup and a support for the cup.

FIG. 2 is a sectional exploded view of the disposable cup and its support.

FIG. 3 is a bottom plan view of the cup taken along the line 3—3 of FIG. 2.

FIG. 4 is a top plan view of the support taken along the line 4—4 in FIG. 2.

FIG. 5 is a partial perspective view of a bottom portion of the disposable cup illustrating the locating notch.

FIG. 6 is a front view of the bottom portion of the disposable cup taken along the line 6—6 in FIG. 3.

Referring to the drawing in detail, wherein like numerals indicate like elements, there is shown in FIG. 1 a stand 10 made of commercially available parts which per se forms no part of the present invention. A disposable cup 14 in accordance with the present invention is supported by support 12 which in turn is mounted on the stand 10. Contacts within the support 12 are adapted to be coupled to a recorder by way of conductors extending through the stand 10 to the plug-in connection 16 or wired directly into a recorder.

The disposable cup 14 is made from a monolithic mass of material such as sand or other equivalent material. As illustrated, the cup 14 includes a cylindrical wall 18 open at its top and provided with a bottom wall 20. The cavity within the cup 14 is slightly tapered as illustrated. The upper lip of the wall 18 is counter-bored at 22 so as to provide a visual indicator whereby it will be readily ascertained that the capacity of the cup is being approached.

The bottom wall 20 is provided with a boss or extension 24. As shown more clearly in FIG. 3, the boss or extension 24 is generally semi-circular.

A central bore 26 is provided in the bottom wall 20 and extends through the boss or extension 24. A dual bore cylinder 28 of ceramic or refractory material is provided. Each of the bores receives one of the thermocouple wires which are joined together at the hot junction 30. Electrical resistor cement or electrical refractory 32 is applied to the exposed portion of the dual bore cylinder 28 and the hot junction 30 of the thermocouple wires. A portion of the cement overlies the bottom wall 20 on the inner surface of the cup.

As shown more clearly in FIG. 3, the vertically disposed wall of the boss or extension 24, which is disposed transversely of the cup, is provided with notches 34 and 36 on opposite sides of the central bore 26. The thermocouple wires are provided with horizontally disposed portions which extend from the bore 26 in the central projection, cross the notches 34 and 36, to the peripheral projections 40 and 42.

The specific type of thermocouple wires used will depend upon the nature of the molten metal being tested. Where the molten metal is gray iron, one of the thermocouple wires will be Chromel and the other will be Alumel. Where the molten metal being tested is steel, one of the thermocouple wires will be platinum and the other platinum rhodium. The thermocouple wires per se, their gauge, and temperature ranges as well as percentages of components are well known to those skilled in the art and need not be described in detail.

As shown more clearly in FIGS. 3 and 5, the boss 24 is provided with a locater notch 44 extending for the full axial length of the boss 24. The notch 44 converges radially inwardly and converges in an axial direction so as to facilitate the ease with which the locater notch will receive a locater pin on the support 12 as will be described in greater detail hereinafter.

The support 12 is comprised of a cylinder of the same configuration as the cross-sectional configuration of the cup 14. The cylinder forming the body of the support 12 is designated as 46. Cylinder 46 has a locater pin 48 adjacent the upper end thereof for cooperation with the locater notch 44. The upper end of cylinder 46 is counterbored so as to provide clearance for the boss 24 when the cup 14 is seated upon the upper end of cylinder 46.

The cylinder 46 is provided with aligned bores of different diameters. An actuator member 54 having a reduced diameter portion 56 extends through the aligned bores. The reduced diameter portion 56 extends through a contact support member 52. A spring 58 surrounds the reduced diameter portion 56 and biases the contact support member 52 into contact with the inner periphery of the cylinder 46 as shown more clearly in FIG. 4. The contact support structure 52 is movable to the right in FIGS. 2 and 4 by pressing on the actuator member 54 so as to compress the spring 58.

The contact support member 52 is made from an electrically non-conductive material such as a grade L phenolic or other equivalent material. Contacts 60 and 62 are supported by the support member 52 and are electrically coupled by conductors, not shown. Each of the contacts 60 and 62 are adapted to contact one of the thermocouple wires exposed at the notches 34 and 36. The material of the contacts 60 and 62 corresponds to the material of the mating thermocouple wires. Thus, if thermocouple wire 64 is of Chromel, it will be contacted by contact 60 which is also of Chromel. Likewise, if thermocouple wire 66 is of Alumel, it will be contacted by contact 62 of Alumel. When such contact is made, the spring 58 biases the contacts 60 and 62 into contact with the exposed portion of the thermocouples as shown in FIG. 6.

The disposable cup 14 and its support 12 are utilized in the following manner:

The plug-in connection 16 is coupled to or can be wired directly to a recorder which is preferably a recorder which can be calibrated directly in points of carbon. Per se, such recorders are known to those skilled in the art and are commercially available. The plug-in connection 16 is coupled to the contacts 60 and 62 on the support 12. The support 12 is removably coupled to the stand 10 by means of setscrews 70 which extend through the tapped holes 72 in the cylinder 46.

The actuator member 54 is pushed inwardly, that is, to the right in FIG. 2, until the contacts 60 and 62 have moved sufficiently far to the right whereby the support 12 will accommodate the cup 14. Pin 48 assists in properly locating the cup 14 with respect to the support 12. As soon as the cup 14 is supported by the support 12, pressure on the actuator member 54 is released, thereby permitting the spring 58 to expand and move the contacts 60 and 62 into engagement with the thermocouple wires 64 and 66, as shown more clearly in FIGS. 3 and 6.

The molten metal is spooned from a bath or stream and is poured from the spoon into the cup 14. The thermocouple wires generate a signal which is transmitted to the recorder as soon as the molten sample is poured into the cup. The recorder can be calibrated to give a reading directly in points of carbon or can be a temperature or millivolt recorder. The whole process takes less than one minute. After a reading is obtained on the recorder, the cup 18 is simply ejected, another quickly inserted in its place, and analysis of another sample immediately undertaken.

Reliability of contact is attained by use of thermocouple wires having contact portions which are horizontally disposed and by contacts which are movable toward and away from the exposed portions of the thermocouples, all as described above. Such a structural interrelationship has proven to be more desirable, more reliable, than plug-in type connections wherein the thermocouple wires are backed-up by sand from the cup. The bottom of the contact support structure 52 is provided with a channel which receives a guide pin 74. The cooperation between the support member 52 and guide pin 74 assures that the contacts 60 and 62 will only have horizontally reciprocatory motion and will not rotate about the axis of the reduced diameter portion 56.

The solid-line illustration of the contacts 60 and 62 of FIG. 4 represents their inoperative position. When the contacts engage the thermocouple wires, they will be in the phantom position illustrated in FIG. 4. During such engagement, the portion of the thermocouples 64 and 66 which engage the respective contacts 60 and 62 are not backed-up by any material. The distance between the solid-line and phantom positions for the contacts 62 and 60 in FIG. 4 is sufficient to assure engagement notwithstanding any minor manufacturing tolerances, thereby providing reliability.

Thus, it will be seen that the disposable cup of the present invention may be utilized in connection with various molten metals such as steel, gray iron, etc. The thermocouples may be any commercially available combination of platinum and platinum-rhodium; Chromel and Alumel, etc. The disposable cup is used in ascertaining the liquidus arrest point which is a function of the carbon content. The carbon content is determinative of the mechanical properties of the metal and therefore must be ascertained by personnel of the mill.

The present invention may be embodied in other specific forms without departing from the spirit or essential attributes thereof and, accordingly, reference should be made to the appended claims, rather than to the foregoing specification as indicating the scope of the invention.

We claim:

1. A disposable cup for use in determining the liquidus arrest point of molten metals comprising a cup-shaped body, a centrally disposed bore in a bottom wall of said body, thermocouple wires supported within said bore with their hot junction inside the cup and below the rim of the cup, the end portions of the thermocouple wires remote from the hot junction being horizontally disposed and supported by a boss on said body, said boss extending from the bottom wall of the cup, said boss having a pair of recesses on an axially directed surface located between said bottom wall and an end face of the boss, each recess exposing a portion of one thermocouple wire for engagement with a contact, and the exposed portions of the thermocouple wires extending in a direction generally perpendicular to said bore.

2. A disposable cup in accordance with claim 1 wherein said boss is generally semi-circular, and said horizontally disposed portions of the thermocouple wires extending generally along a diameter of the cup.

3. A disposable cup in accordance with claim 1 wherein said boss is provided with a peripheral notch adapted to cooperate with a locater pin.

4. A disposable cup in accordance with claim 1 wherein said boss is generally semi-circular, said recesses being defined by a central projection and two peripheral projections on the boss, said bore extending through said central projection.

5. A disposable cup in accordance with claim 4 wherein said projections are provided with aligned notches on their bottom surfaces, said thermocouple wire end portions being received in said notches.

6. A disposable cup in accordance with claim 1 including refractory cement on the hot junction of said thermocouple wires.

7. Apparatus in accordance with claim 9 wherein said contacts are on a support member of electrically non-conductive material supported for reciprocation in a direction generally perpendicular to said bore and the horizontal portions of said thermocouple wires, and spring means biasing said member so that its contacts may engage the exposed portions of said thermocouple wires.

8. A disposable cup in accordance with claim 6 wherein said wires are in a double bore cylinder positioned in said bore, said cement joining said cylinder to said cup-shaped body.

9. Apparatus comprising a stand, a cup support mounted on said stand, said cup support including a pair of spaced contacts, a disposable cup for use in determining the liquidus arrest point of molten metals removably mounted on said support, said cup including a cup-shaped body, said body having a centrally disposed bore in a bottom wall thereof, thermocouple wires mounted within said bore with their hot junction inside the cup and below the rim of the cup, the end portions of the thermocouple wires remote from the hot junction being horizontally disposed and supported by a boss on said body, said boss extending from the bottom wall of the cup and at least partially extending into said support, said boss having a pair of recesse each exposing a portion of one thermocouple wire for engagement with one of said contacts, the exposed portions of the thermocouple wires extending in a direction generally perpendicular to said bore.

10. Apparatus in accordance with claim 9 including means supporting said contacts for movement in unison toward and away from the exposed portions of the thermocouple wires, and spring means biasing said contacts into engagement with said exposed portions of the thermocouple wires, and means for selectively moving said contacts against the spring bias, said last-mentioned means being on said cup support.

References Cited
UNITED STATES PATENTS

| | | | |
|---|---|---|---|
| Re. 26,409 | 6/1968 | Hance | 73—359 |
| 1,976,501 | 10/1934 | James | 339—74 |
| 3,493,439 | 2/1970 | Boyle | 136—234 |

RICHARD C. QUEISSER, Primary Examiner

C. E. SNEE III, Assistant Examiner

U.S. Cl. X.R.

73—17 R; 339—174